May 20, 1930.  W. F. HEIMGARTNER  1,759,309
CORN SHELLER FEED CHAIN
Filed Sept. 3, 1929
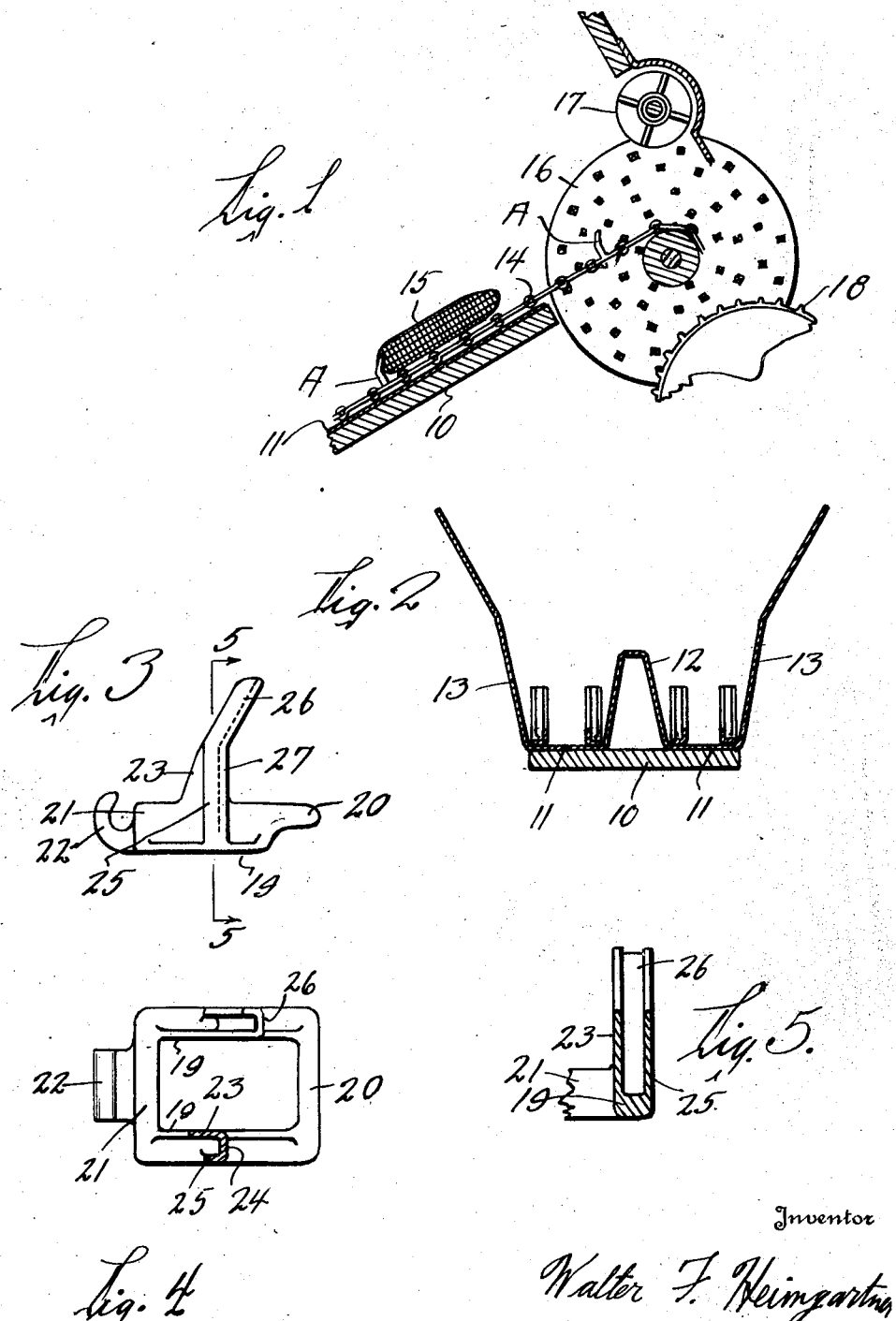

Patented May 20, 1930

1,759,309

UNITED STATES PATENT OFFICE

WALTER F. HEIMGARTNER, OF LINCOLN TOWNSHIP, PLYMOUTH COUNTY, IOWA

CORN-SHELLER FEED CHAIN

Application filed September 3, 1929. Serial No. 390,111.

My invention relates to corn shelling machines and machines of the type in which ears of corn are conveyed or operated upon and has for object to provide a conveyor chain for this particular type of machine.

The purpose of my invention is to provide a conveyor chain which is particularly adapted to select ears of corn from a hopper and to carry those ears up an incline, the chain being particularly adapted to securely engage an ear of corn so that the ear will not escape from the chain.

A further object is to provide a conveyor chain which is regular and sure in operation and which will not miss. In other words, it is my purpose to provide a chain in which each of the successive ear engaging links of the chain is adapted to select one ear of corn with certainty so that the efficiency of operation of the chain may be as high as possible.

Another object is to provide a chain in which the ear engaging link has an improved feature of construction guarding against the deforming of the link by the ears of corn wearing against it.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a longitudinal, sectional view through a corn sheller conveyor with the chain of my invention embodied therein.

Fig. 2 is a transverse, sectional view through the conveyor.

Fig. 3 is an enlarged, detailed view of one of the ear engaging links, and

Fig. 4 is a plan view of the same.

Fig. 5 is a detail, sectional view taken on the line 5—5 of Fig. 3.

I have used the reference character 10 in the accompanying drawings to indicate the base board of the conveyor of a corn sheller. The trough proper is made of sheet metal and has the two bottom walls 11, separated by a whale bone 12 and the side walls 13, forming together with the whale bone 12 and bottom walls 11 a pair of parallel troughs. In each of the troughs thus formed, a feed chain 14 travels.

The chain 14 carries the ears of corn 15 from a hopper, which is not shown, between the studded picker wheels. The members 17 and 18 are known as the beater force feed and bevel runner, respectively.

It will be seen that the function of the conveyor or feeder chain 14 is to carry the ears of corn in regular succession to the picker wheels 16. The chain is provided with ear engaging links A, which are spaced at regular intervals along the chain and it is desirable that each of the links A engage and carry an ear to the picker wheels 16.

It has been found in actual practice with the present type of chain, however, that quite often an ear engaging link will "miss", that is, will fail to securely engage an ear so as to carry it to the picker wheels 16. In many cases, the smooth, round butt of the ear will slide upwardly over the prongs of the link, allowing the link to pass on unloaded.

One of the reasons for the missing of the conveyor links arises from the wearing of the prongs of the link by the ears until the prongs have become deformed.

The ordinary link comprises a loop having the side arms 19 and cross arms 20 and 21, respectively, the cross arm 21 being provided with a hook 22 to engage the arm 20 of an adjacent link of the chain. The lugs or fingers which are provided to engage the ear in the ordinary link, comprising the side arms 23 and the outwardly extending webs 24, forming in cross section an L shaped structure.

In practice, it is found that the webs 24 will gradually be bent rearwardly by collision with ears of corn until the forward faces of the lugs will then tend to slip away from an ear of corn which is engaged by one side of the link and will not be as efficient in engaging an ear of corn as they were when the faces 24 were perpendicular to the arms 23.

I find that by providing the lugs with an outer side web 25, formed integrally with the web 24 and extending rearwardly, that this objection is overcome.

The webs 25 prevent the webs 24 being bent rearwardly.

The webs 25 at their lower ends merge with the side arms 19 of the link, as shown in Fig. 5.

The slipping of the ear upwardly over the lugs of the ear engaging link is prevented by providing the lugs with the forwardly bent portions 26. The lugs thus comprise the portions 27, which are perpendicular to the plane of the link and which extend substantially half the height of the lugs and with the forwardly bent portions 26 continuing from the portions 27. The portions 26 will engage the butt of an ear somewhat from above as indicated in Fig. 1, so that the ear, in order to slip upwardly between the lugs, would have to move forwardly a slight distance. The lugs thus form a pocket in which the butt of the ear is imprisoned and the hold which the lugs obtain upon the ear is thus made very secure.

I have found that the operation of the corn sheller equipped with a chain constructed according to my invention is very much more certain and uniform than that of a corn sheller embodying the old type of feeder chain. The result is an increase in the efficiency of the machine and an increase in the number of bushels of corn which it will handle per hour.

My invention is peculiarly adapted to feeder chains for corn handling machines and does not apply generally to other types of conveyor chains. To be more specific, my invention contemplates specifically the problem of engaging the butt of an ear of corn in such a manner that the ear of corn will be most securely held by the feeder chain.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a feed chain link for corn shellers, a loop having means for attachment to other links, said loop including side arms, and a pair of spaced prongs formed integrally with said side arms, extending first at right angles to the plane of the loop and thence extending in parallel relation to each other, in a direction inclined away from the loop and toward one end thereof, at an angle to the plane of the loop, the length and spacing of the inclined portions being such that they will follow roughly the contour of the butt end of an ear of corn received by the prongs.

2. In a feed chain link for corn shellers, a loop having means for attachment to other links, said loop including side arms, and a pair of spaced prongs formed integrally with said side arms, each of said prongs being channel-shaped in cross section and comprising an inner wall, substantially flush with the inner side of the side arm to which it is attached, an intermediate flange, extending at right angles to, and outwardly from the wall, and an outer flange, extending at right angles to the intermediate flange.

Signed this 16th day of August, 1929, in the county of Woodbury and State of Iowa.

WALTER F. HEIMGARTNER.